US010951369B2

(12) United States Patent
Wang et al.

(10) Patent No.: US 10,951,369 B2
(45) Date of Patent: Mar. 16, 2021

(54) INTER-POINT DATA EXCHANGE IN UL COMP

(71) Applicant: Telefonaktiebolaget LM Ericsson (publ), Stockholm (SE)

(72) Inventors: Jianfeng Wang, Beijing (CN); Fredrik Huss, Sundbyberg (SE); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 15/514,497

(22) PCT Filed: Oct. 30, 2014

(86) PCT No.: PCT/CN2014/089857
§ 371 (c)(1),
(2) Date: Mar. 24, 2017

(87) PCT Pub. No.: WO2016/065564
PCT Pub. Date: May 6, 2016

(65) Prior Publication Data
US 2017/0279575 A1    Sep. 28, 2017

(51) Int. Cl.
H04L 5/00        (2006.01)
H04W 72/02      (2009.01)
H04W 24/08      (2009.01)
H04W 72/08      (2009.01)
H04W 28/06      (2009.01)
H04B 7/024      (2017.01)

(52) U.S. Cl.
CPC ............ *H04L 5/0032* (2013.01); *H04L 5/006* (2013.01); *H04L 5/0035* (2013.01); *H04L 5/0085* (2013.01); *H04W 24/08* (2013.01); *H04W 72/02* (2013.01); *H04W 72/085* (2013.01); *H04B 7/024* (2013.01); *H04W 28/06* (2013.01)

(58) Field of Classification Search
None
See application file for complete search history.

(56) References Cited

U.S. PATENT DOCUMENTS

2009/0046647 A1    2/2009  Roh et al.
2011/0110304 A1*   5/2011  Kuchi .................. H04L 25/021
                                              370/328
2012/0093105 A1    4/2012  Park et al.
(Continued)

OTHER PUBLICATIONS

Extended European Search Report for Application No. 14904784.7, dated Sep. 28, 2018, 11 pages.
(Continued)

*Primary Examiner* — Adnan Baig
(74) *Attorney, Agent, or Firm* — NDWE LLP

(57) ABSTRACT

A data exchange method in a Coordinated Multi-Point (CoMP) system, including an assistant point and a converging point. One method comprises selecting a predetermined number of subbands with the best channel quality, and exchanging user data of the selected subbands. Only part of the user data received at the assistant point is transmitted to the converging point. The requirement on the transport network capacity is thus loosened. By transmitting data with the best channel quality, a good enough gain is guaranteed.

9 Claims, 8 Drawing Sheets

(56) References Cited

U.S. PATENT DOCUMENTS

| | | | |
|---|---|---|---|
| 2012/0218968 A1* | 8/2012 | Kim | H04B 7/024 370/329 |
| 2013/0083681 A1* | 4/2013 | Ebrahimi Tazeh Mahalleh | H04L 5/0057 370/252 |
| 2013/0294352 A1* | 11/2013 | Park | H04W 24/10 370/328 |
| 2014/0036664 A1* | 2/2014 | Han | H04L 67/16 370/230 |
| 2014/0036737 A1 | 2/2014 | Ekpenyong et al. | |
| 2014/0301278 A1* | 10/2014 | Ghosh | H04W 28/0289 370/328 |
| 2014/0362802 A1* | 12/2014 | Jitsukawa | H04B 7/0632 370/329 |

OTHER PUBLICATIONS

International Search Report and Written Opinion, Application No. PCT/CN2014/089857, dated Aug. 5, 2015, 13 pages.
International Preliminary Report on Patentability for Application No. PCT/CN2014/089857, dated May 11, 2017, 6 pages.
Partial Supplementary European Search Report for Application No. 14904784.7, dated May 23, 2018, 12 pages.
Examination Report from foreign counterpart Indian Patent Application No. 201717008576, dated May 15, 2019, 5 pages.
Office Action from foreign counterpart Mexican Patent Application No. MX/a/2017/004084, dated Feb. 15, 2019, 6 pages.
Office Action for Canada Application No. 2,965,860, dated Dec. 9, 2020, 5 pages.

* cited by examiner

INTER-POINT DATA EXCHANGE IN UL COMP

CROSS-REFERENCE TO RELATED APPLICATIONS

This application is a National stage of International Application No. PCT/CN2014/089857, filed Oct. 30, 2014, which is hereby incorporated by reference.

TECHNICAL FIELD

The disclosure relates to a technique of inter-point data exchange in an uplink in a CoMP (Coordinated Multi-Point) scenario. In particular, some embodiments of the disclosure relate to a data exchange method for use in a CoMP system with a limited capacity.

BACKGROUND

Unless otherwise indicated herein, the approaches described in this section are not prior art to the claims in this disclosure and are not admitted to be prior art by inclusion in this section.

Currently, the CoMP Work Item was approved in 3GPP RAN plenary #53 meeting. A User Equipment (UE) in a CoMP scenario means that a UE is served by at least two nodes at the same time, including a macro node and at least one pico node. Uplink Coordinated Multi-Point Joint Reception (UL CoMP-JR) is an advanced technology introduced in LTE to improve the coverage of high data rate service, cell-edge throughput and/or to increase system throughput, due to the increased UE signal receiving power and good interference suppression of one or several interferers. UL CoMP JR operation targets many different deployments, including coordination between sites and sectors in cellular macro deployments, as well as different configurations of heterogeneous deployments, where for instance a macro-node coordinates the transmission with pico-nodes within the macro node's coverage area.

FIG. 1 shows a CoMP scenario, and FIG. 2 shows an UL processing procedure in a CoMP scenario. As shown, a UE 140 may be served by a converging point 110 and two assistant points 120 and 130. The converging point 110 transmits service data directly to the UE 140, and to the assistant points 120 and 130, which forward the received service data to the UE 140. The UE 140 jointly processes the service data received from the converging point 110 and from the assistant points, and can get a service with an increased gain. Similarly, the UE 140 transmits signals directly to the converging point 110. The assistant points 120 and 130 are capable of receiving the signals transmitted from the UE 140.

The assistant points 120 and 130 may optionally pre-process the received signals, and forward the pre-processed signals to the converging point 110. On each assistant point, the received signals could be hard or soft demodulated according to the requirements as the optional pre-processing. The converging point 140 then co-processes the signals received from the UE and from the assistant points. After co-processing, the signal quality from the UE is well improved because of the combination of the multiple received signals from multiple points, so that the system performance, such as cell-edge throughput, can be improved in the UL in the CoMP scenario. The converging point may be the serving point, for example the macro node, and the assistant points may be the cooperated points, for example, the pico nodes.

From the above mentioned UL CoMP processing procedure, it is noted that one key issue for UL CoMP is to exchange received UE signals between points, which are normally geometry distributed. Therefore, this normally requires a proper transport network capacity for the inter-point data exchanging, and different pre-processing options would have different transport network capacity requirements.

The typical pre-processing options, maximum transport network capacity requirements and potential UL CoMP gains are illustrated and listed in Table 1, where the result is obtained based on the assumptions of eight receiving antennas on each point, 20 MHz bandwidth and TDD subframe configuration 1.

TABLE 1

Exchange channel capacity requirements for UL CoMP

| Pre-processing | Max. Transport capacity requirement | UL CoMP gain |
| --- | --- | --- |
| Time domain raw data | 4 Gbps | High |
| Frequency domain raw data | 2.4 Gbps | High |
| Soft bit conversion | 100 Mbps | Medium-High |
| Decoded data | 12 Mbps | Low |

The received signals on each point can be exchanged without/with simple pre-processing, i.e., raw data in time or frequency domain. Though the UL CoMP gain is large, the transport network capacity requirement is very huge, i.e., 4 Gbps for the time domain raw data exchanging, which needs intra-board data exchange or dedicated fiber connection between points and it is impossible in many deployments.

On the other hand, the signals can be decoded as a series of hard bits on each point to be exchanged. Though the transport network capacity requirement is small, i.e., 12 Mbps, the UL CoMP gain is low because there is almost not much extra information from the hard decoded data for further co-processing.

The soft bits exchange after soft demodulation as the pre-processing on each point is considered to provide for a good balance between transport capacity and UL CoMP gain.

In UL CoMP, as the key issue, the capacity of inter-point transport network directly determines the potential gains. In general, the capability of inter-point communication normally depends on the operator's transport network deployment, which can be:

Direct fiber connection, which can provide high transport capacity while be with the high rollout expense.

Re-use (or rent) of some existed wired transport network, like Packet Transport Network (PTN), which normally can only provide tens of Mbps transport capacity.

For most of operators, especially in dense urban which really needs UL CoMP feature to improve performance, the second one, i.e., re-use of existed wired transport network, is always selected.

It is noted from Table 1 that even though the maximum transport capacity requirement of the pre-process scheme, soft-bit exchange, is much lower than that of time/frequency domain raw data, it still heavily exceeds the real transport network capacity for the above mentioned second deployment. Therefore, in this case, to save the bandwidth, the operators have to switch off UL CoMP feature, or limit the number of UEs to utilize UL CoMP, which would heavily constrain the UL CoMP gains due to such small inter-point transport capacity.

On the other hand, the inter-point transport network bandwidth has to be shared with other communications, such as X2-Handover signaling, etc., which definitely has the higher priority than UL CoMP. Thus, the inter-point data exchange bandwidth for UL CoMP is not always fixed.

In addition, some prior art use traditional bandwidth reduction method to reduce the UL CoMP bandwidth requirement, such as to reduce the number of sampling bits though it increases the quantization noise. However, it normally can only reduce 20~30% bandwidth requirement, which is still not enough for real deployment.

In total, the prior art cannot fully utilize bandwidth in a flexible way.

SUMMARY

An object of the disclosure is to provide a data exchange method for use in a CoMP scenario, in which the data to be exchanged for further co-processing are well selected to match the inter-point network capacity and meanwhile guarantee a good enough UL CoMP gain.

According to a first aspect, there is provided a data exchange method for use in an assistant point in a CoMP (Coordinated Multi-Point) system. Firstly, a predetermined number N of subbands with the best channel quality is selected at the assistant point. The selected subbands having best channel quality means that the selected subbands have channel quality better than any of the other unselected subbands of the assistant point. User data of the selected N subbands are then transmitted to a converging point for co-processing. Thereby, not all the user data, but specially selected ones are transmitted from the assistant point to the converging point. The requirement on transport network capacity is loosened by reducing the amount of data transmitted. Meanwhile, the UL CoMP gain is guaranteed by transmitting the data with the best channel quality.

In one embodiment, the selecting N subbands with the best channel quality further comprises calculating RBQ (Resource block quality) values of all subbands, and selecting N subbands with the largest N RBQ values as the N subbands with the best channel quality. The assistant point determines the user data to be transmitted by processing its own user data. The processing is simple.

In one embodiment, the selecting N subbands with the best channel quality further comprises calculating RBQ values of all subbands, receiving RBQ values of all subbands from the converging point, calculating uplink gains of all subbands based on the RBQ values of the converging point and the RBQ values of the assistant point, and selecting N subbands with the largest uplink gains as the N subbands with the best channel quality. The assistant point determines the user data to be transmitted by processing its own user data based on information from the converging point. The processing is simple and the load on the converging point is moderate.

In one embodiment, the indexes of the selected N subbands are transmitted to the converging point.

In one embodiment, the user data and the indexes are transmitted in different signalling.

In one embodiment, the selecting N subbands with the best channel quality further comprises calculating RBQ values of all subbands, transmitting the RBQ values of all subbands to the converging point, receiving indexes of N subbands from the converging point, and selecting the N subbands with the received indexes as the N subbands with the best channel quality. The assistant point transmits information on its own user data to the converging point, which determines the user data to be received from the assistant point, and informs the assistant point the determination. The assistant point then transmits the determined user data to the converging point.

In one embodiment, the converging point calculates uplink gains of all subbands for the respective assistant points based on the RBQ values of the converging point and the RBQ values of the respective assistant point, and transmits indexes of N subbands with the largest uplink gains to the respective assistant points. A good uplink gain can be obtained since the converging point which co-processes the user data determines the user data to be used.

In one embodiment, the assistant point pre-processes the user data to obtain soft bits, and transmits the obtained soft bits as the user data to the converging data. The solution is thus applicable in a network with a limited capacity.

In one embodiment, the converging point is a serving point in the system.

In one embodiment, the converging point is identified by an upper layer component. The assistant point receives a notification message from the upper layer component, indicating the converging point.

In one embodiment, the assistant point transmits RBQ values of all subbands to the upper layer component, which sums the RBQ values for respective points, and selects a point with the largest summed RBQ value as the converging point.

According to a second aspect, there is provided an assistant point in a CoMP system. The assistant point comprises a data determination unit configured to select a predetermined number N of subbands with the best channel quality, the selected subbands having channel quality better than other subbands of the assistant point; and a transmitter configured to transmit user data of the selected N subbands to a converging point.

According to a third aspect, there is provided an assistant point in a CoMP system. The assistant point comprises at least one communication interface configured for communication, a processor, and a memory storing computer program code thereon which, when running in the processor, causes the assistant point to: select a predetermined number N of subbands with the best channel quality, the selected subbands having channel quality better than other subbands of the assistant point; and wherein the communication interface is configured to transmit user data of the selected N subbands to a converging point.

According to a fourth aspect, there is provided a data exchange method for use in a converging point in a CoMP system. The converging point calculates RBQ (Resource block quality) values of all subbands, and transmits the RBQ values to all assistant points. In response to the transmission, the converging point receives user data of a predetermined number N of subbands or indexes of the N subbands from assistant points used for multiple reception, so as to co-process the user data. the N subbands are selected by the respective assistant points by using the RBQ values of the converging point and RBQ values of the respective assistant points to calculate uplink gains of all subbands and selecting N subbands with the largest uplink gains.

According to a fifth aspect, there is provided a data exchange method for use in a converging point in a CoMP system. The converging point calculates RBQ (Resource block quality) values of all subbands, and receives RBQ values from assistant points used for multiple reception. The converging point then calculates uplink gains of all subbands based on the RBQ values of the converging point and RBQ values of the respective assistant points, and selects a predetermined number N of subbands with the largest uplink gains. The converging point then transmits indexes of the selected N subbands to respective assistant points. In response to the transmission, the converging point receives user data of the selected N subbands from the respective assistant points

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the disclosure, the user data to be exchanged for further co-processing are selected at assistant points or a converging point, to match the inter-point transport network capacity and meanwhile guarantee a good UL CoMP gain.

Figure 3:
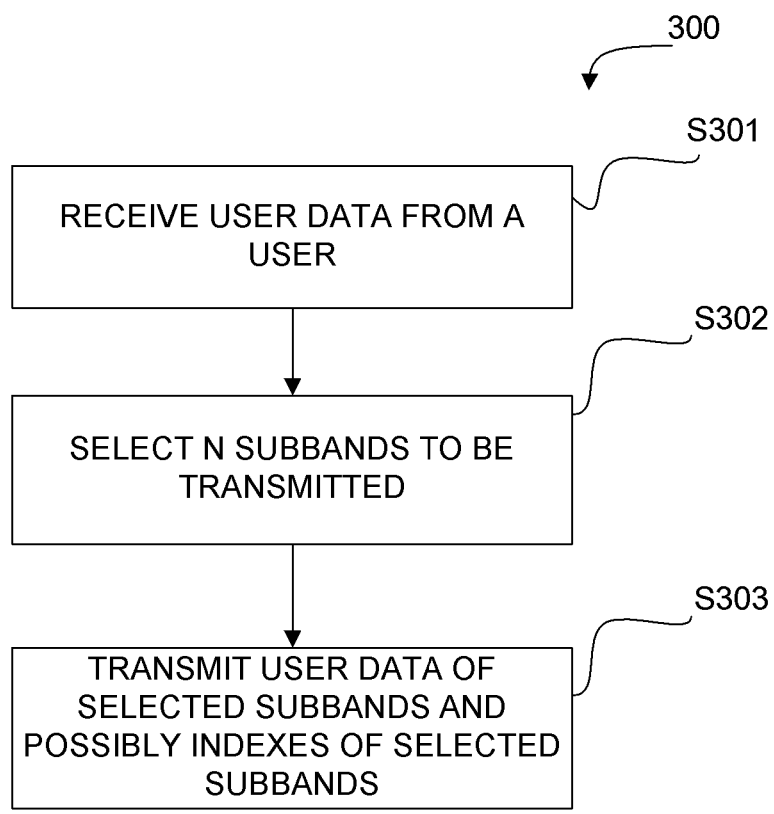
FIG. 3 illustrates a flowchart of a data exchange method according to an embodiment of the disclosure.

FIG. 3 illustrates a flowchart of a data exchange method 300 according to an embodiment of the disclosure. The method 300 occurs at an assistant point. As shown, firstly, the assistant point receives user data from a user (e.g., a UE) at step S301. At step S302, the assistant point selects subbands to be transmitted. In order to guarantee the UL gain, the assistant point selects those subbands with the best channel quality. That is, the selected subbands have a channel quality better than any of the other subbands of the assistant point. The number of selected subbands, N, is predetermined according to the current transport network status, such as the network capacity. Then at step S303, the assistant point transmits user data of the selected subbands to the converging point. In case that the converging point is not aware of the indexes of the selected subbands, the assistant point also transmits the indexes of the selected subbands to the converging point. The transmission of the user data and of the indexes may be performed by the same signalling, or by different signalling.

Figure 1:
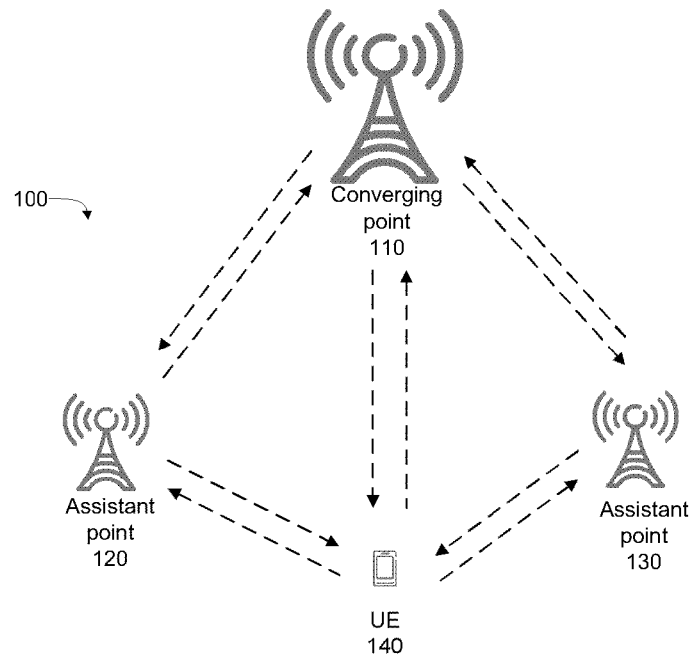
FIG. 1 shows a CoMP scenario.
Figure 2:
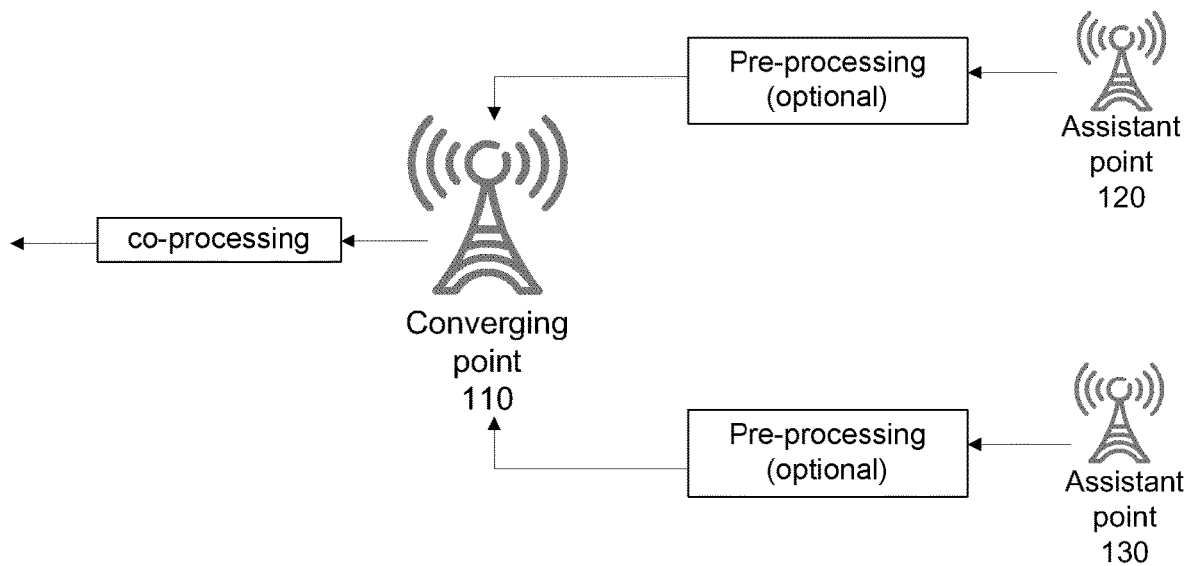
FIG. 2 shows an UL processing procedure in a CoMP scenario.
Figure 4:
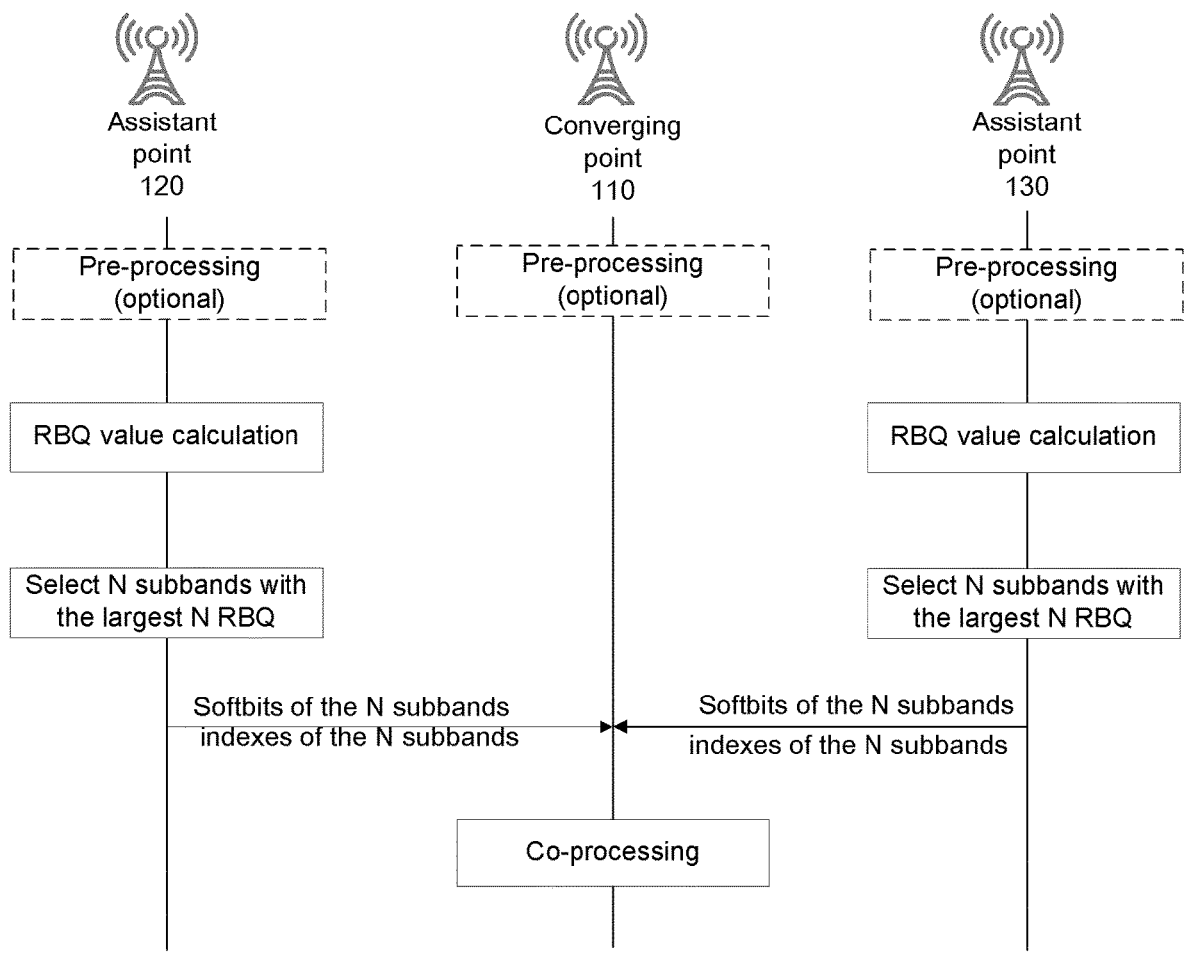
FIG. 4 illustrates a sequence of a data exchange procedure according to an embodiment of the disclosure.

FIG. 4 illustrates a sequence of a data exchange procedure according to an embodiment of the disclosure. FIG. 4 is shown by taking the scenario shown in FIG. 1 as an example. It is obvious that the number of assistant points in the system is not limited to two. There may be more or less assistant points in the system. Each assistant point, after having received user data from the UE 140, calculates RBQ (Resource block quality) values of all subbands, and selects N subbands with the largest N RBQ values. According to the deployment, the N subbands selected by the assistant point 120 may be different from those selected by the assistant point 130. The assistant points 120 and 130 then each transmit the user data of the selected N subbands to the converging point 110. The assistant points 120 and 130 also transmit the indexes of the selected N subbands to the converging point 110. The converging point 110 co-processes the user data received from respective assistant points 120 and 130 and from the UE 140.

In LTE, a number of subbands, i.e., physical resource blocks, are allocated for a scheduled UE to transmit data, which are numbered as M. The channel quality may be represented by the signal to interference and noise ratio (SINR) value. On a point, the SINR on each subband of the UE can be obtained after channel/interference estimation and equalization. The SINR values are converted to a RBQ value of this subband, and the RBQ value of the $i^{th}$ subband on the $j^{th}$ point is denoted as $$RBQ_i^{(j)} = K \log(1+SINR_i^{(j)}) \quad (1)$$

where K is the number of subcarriers in a subband.

The UL CoMP gain from multiple points with exchanging and integration on the $j_l^{th}$ point for the $i^{th}$ subband is defined as $$g^{(j_l)}(i) = \frac{\sum_{j=0, j \neq j_l}^{J-1} RBQ_i^{(j)}}{RBQ_i^{(j_l)}} \quad (2)$$

where J is the number of points used for multiple receptions in uplink in the CoMP system.

Each assistant point may obtain the RBQ values of all subbands as above, and selects N subbands with the largest N RBQ values as the N subbands with the best channel quality.

The disclosure is not limited to the RBQ and uplink gains calculation as above, and any other appropriate criteria that can represent the channel quality are applicable. For example, the SINR value may be used instead of the RBQ.

Figure 5:
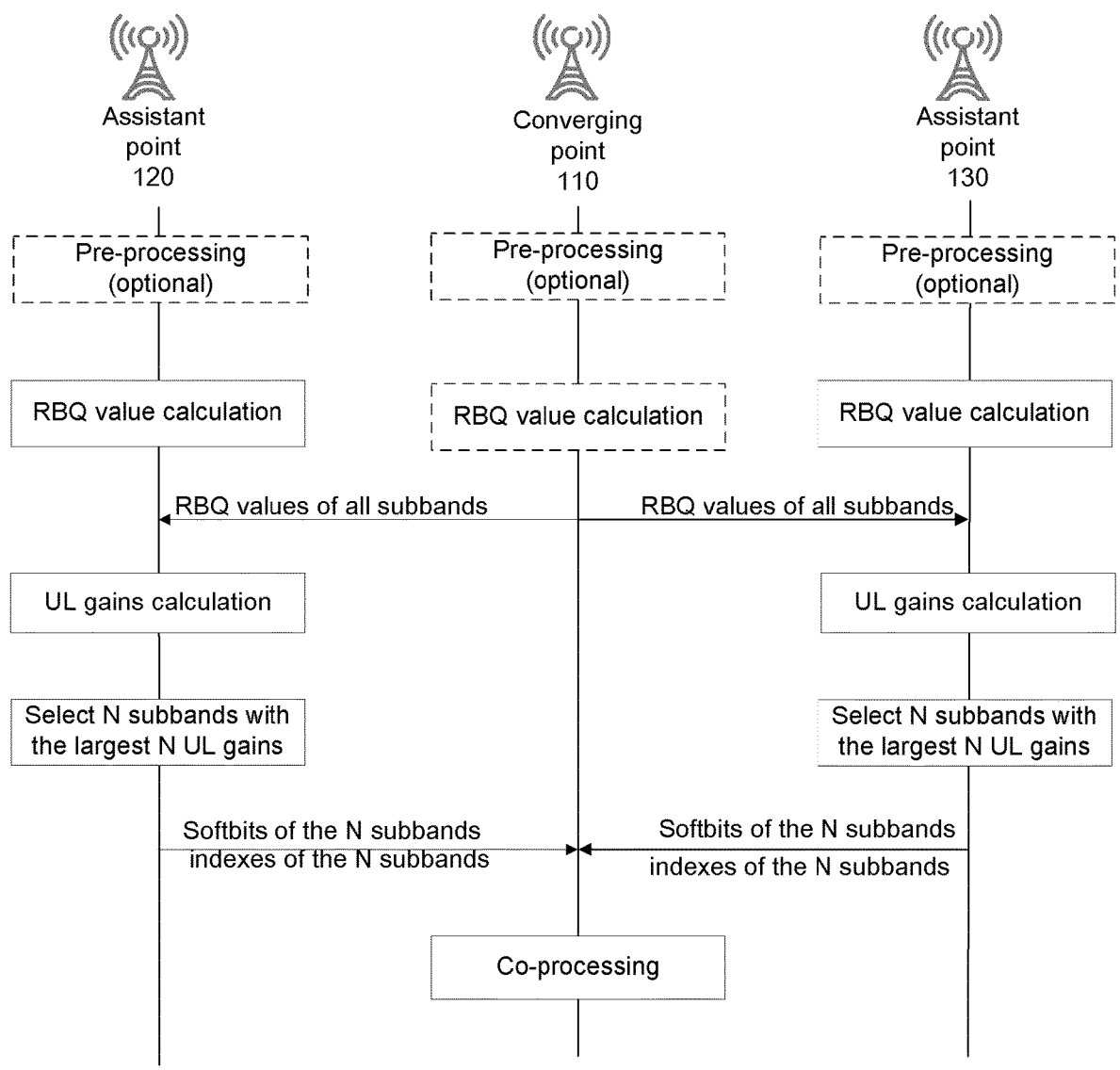
FIG. 5 illustrates a sequence of a data exchange procedure according to another embodiment of the disclosure.

FIG. 5 illustrates a sequence of a data exchange procedure according to another embodiment of the disclosure. FIG. 5 is shown by taking the scenario shown in FIG. 1 as an example. It is obvious that the number of assistant points in the system is not limited to two. There may be more or less assistant points in the system.

Each point, including the assistant points 120 and 130, and the converging point 110, after having received user data from the UE 140, calculates RBQ values of all subbands themselves. The converging point 110 then transmits its RBQ values of all subbands to each assistant point. The assistant points 120 and 130 then calculate uplink gains of all subbands based on the RBQ values of the converging point and its own RBQ values, by for example, equation (2) above. The assistant points 120 and 130 each select N subbands with the largest uplink gains as the N subbands with the best channel quality. The assistant points 120 and 130 then transmit the user data of the selected N subbands to the converging point 110. The assistant points 120 and 130 also transmit the indexes of the selected N subbands to the converging point 110. The converging point 110 co-processes the user data received from respective assistant points 120 and 130 and from the UE 140.

Figure 6:
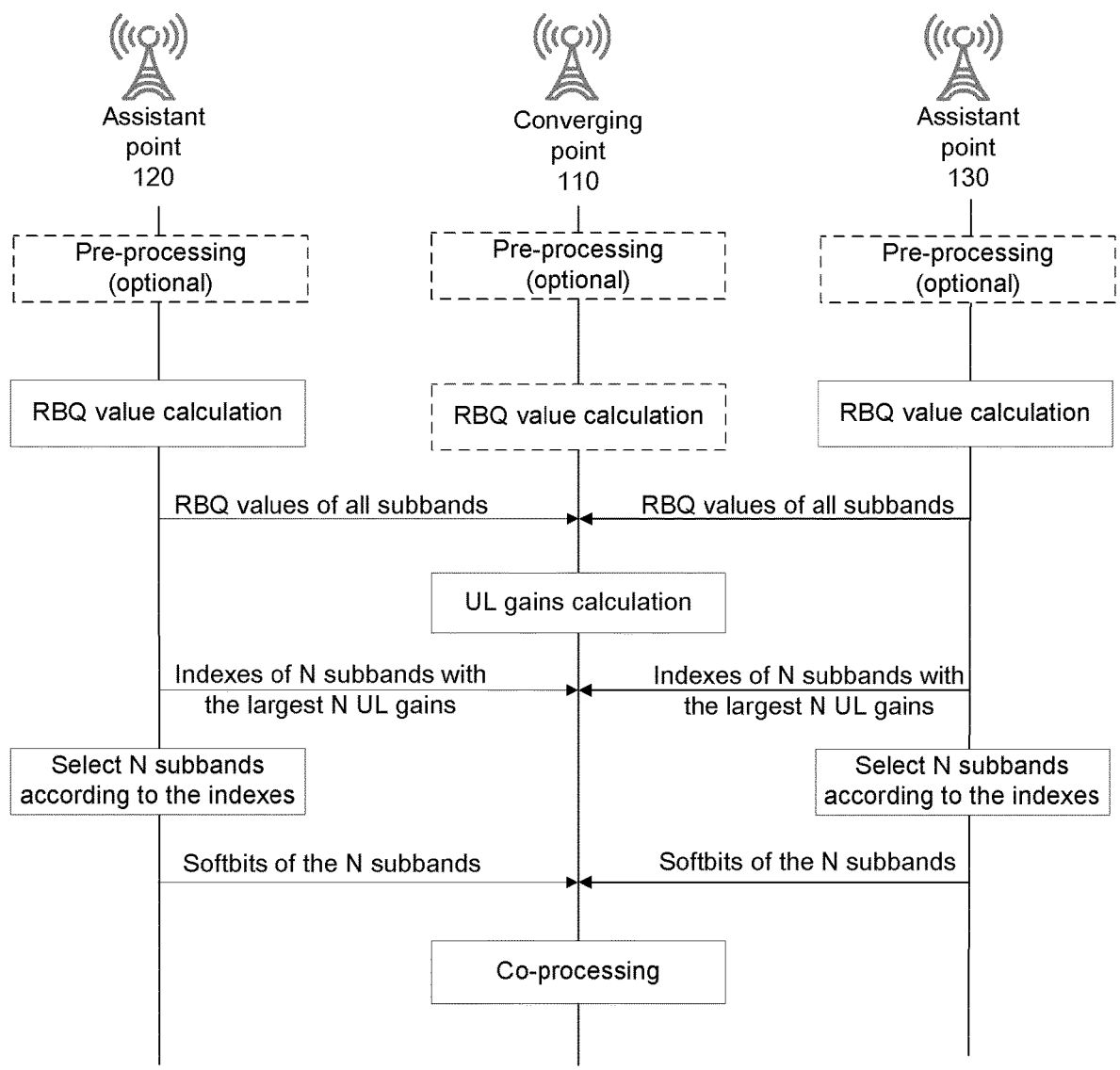
FIG. 6 illustrates a sequence of a data exchange procedure according to still another embodiment of the disclosure.

FIG. 6 illustrates a sequence of a data exchange procedure according to still another embodiment of the disclosure. FIG. 6 is shown by taking the scenario shown in FIG. 1 as an example. It is obvious that the number of assistant points in the system is not limited to two. There may be more or less assistant points in the system.

Each point, including the assistant points 120 and 130, and the converging point 110, after having received user data from the UE 140, calculates RBQ values of all subbands. Each of the assistant points 120 and 130 transmits its RBQ values of all subbands to the converging point 110, which calculates uplink gains of all subbands based on the RBQ values of the assistant points and its own RBQ values, by for example, equation (2) above. The converging point 110 selects N subbands with the largest uplink gains as the N subbands with the best channel quality, and informs each assistant point of indexes of the N subbands. The assistant points 120 and 130 then select N subbands according to the indexes received from the converging point 110, and transmit the user data of the selected N subbands to the converging point 110. Finally, the converging point 110 co-processes the user data received from respective assistant points 120 and 130 and from the UE 140.

In the data exchange procedure sequences shown in FIGS. 4-6, it is illustrated that each point may pre-process the user data received from the UE 140. As shown in Table 1, soft-bit pre-processing may reduce the requirement on transport capacity while maintaining an acceptable UL gain. Accordingly, each point may convert the user data received from the UE 140 into soft bits, and then transmit soft bits of the selected subbands for co-processing. Certainly, the disclosure is also applicable to any other pre-processing option, such as the raw data in time or frequency domain without pre-processing. That is, the user data exchanged between converging node and assistant nodes may be the raw data received from the UE.

In the system, the converging point may be known to all the points in the system. In an embodiment, it is a serving point. In another embodiment, it is decided by an upper layer component, such as a RNC (Radio Network Controller) in LTE. All points in the system transmit RBQ values of all subbands to the upper layer component, which sums the RBQ values for respective points and selects a point with the largest summed RBQ value as the converging point. The upper layer component may inform the points of the determined converging point by a notification message.

The soft bit means the post-processed data after demodulation with soft outputs. It is always regarded as a log-likelihood ratio (LLR), which quantifies the different probability level for a bit to be '0' or '1'. These soft bits are fed into a Turbo decoder to be decoded.

The methods and procedures according to the disclosure described above may be performed by any suitable components or other means capable of performing the corresponding functions of the methods and procedures. For example, the methods and procedures may be performed at any assistant point illustrated in FIG. 7 and at a converging point (not shown).

Figure 7:
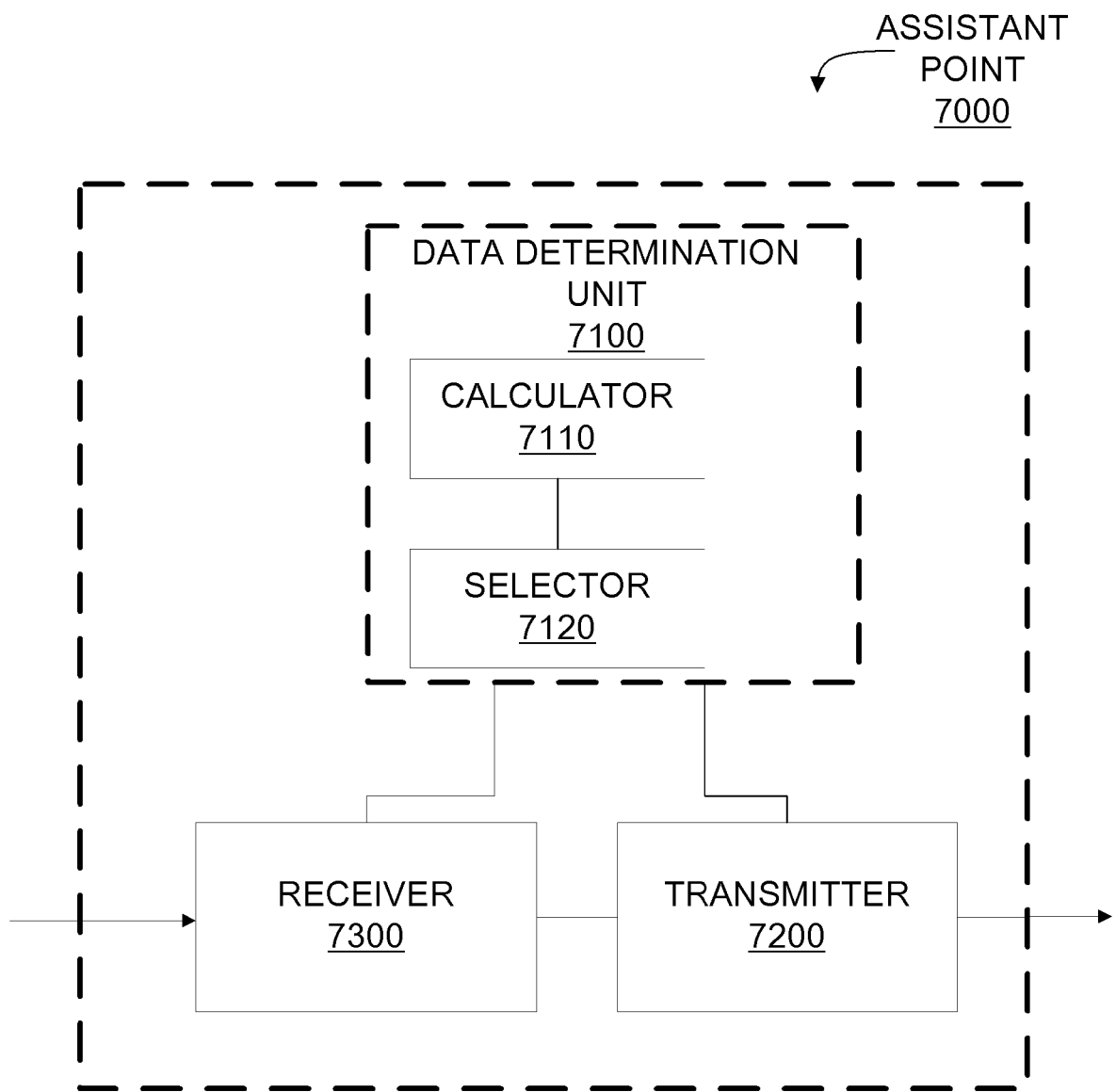
FIG. 7 illustrates a block diagram of an assistant point according to an embodiment of the disclosure.

FIG. 7 illustrates a block diagram of an assistant point 7000 according to another embodiment of the disclosure. As shown, the assistant point 7000 comprises a data determination unit 7100, a transmitter 7200, and a receiver 7300. The data determination unit 7100 is configured to select a predetermined number N of subbands with the best channel quality. The transmitter 7200 is configured to transmit user data of the selected N subbands to the converging point.

In an embodiment, such as for the assistant points 120 and 130 in FIG. 4, the data determination unit 7100 may comprise a calculator 7110 configured to calculate RBQ values of all subbands, and a selector 7120 configured to select N subbands with the largest N RBQ values as the N subbands with the best channel quality, as shown in FIG. 7.

In an embodiment, such as for the assistant points 120 and 130 in FIG. 5, the receiver 7300 receives RBQ values of all subbands from the converging point 110. The calculator 7100 calculates RBQ values of all subbands, and calculates uplink gains of all subbands based on the RBQ values of the converging point and its own RBQ values. The selector 7120 selects N subbands with the largest uplink gains, and the transmitter 7200 transmits user data of the selected N subbands to the converging point 110. The transmitter 7200 also transmits indexes of the selected N subbands, so that the converging point knows from which subbands the received data user are.

In an embodiment, such as for the assistant points 120 and 130 in FIG. 6, the transmitter 7200 transmits the calculated RBQ values to the converging point 110, which decides the N subbands of the best channel quality. In response to the transmission of the transmitter, the receiver 7300 receives indexes of N subbands from the converging point. The selector 7120 selects N subbands according to the received indexes, and the transmitter 7200 then transmits user data of the selected N subbands to the converging point.

The converging point shall be known to the assistant points. For example, the converging point may be the serving point in the system. As an alternative, the converging point in the system may be decided by an upper layer component, such as a RNC (Radio Network Controller) in a LTE. The transmitter 7200 of each assistant point transmits RBQ values of all subbands to the upper layer component. The upper layer component sums the RBQ values for respective points, and selects a point with the largest summed RBQ value as the converging point. The upper layer component may inform the point of the determined converging point by a notification message. The receiver 7300 of each assistant point receives the notification message indicating the converging point, and thereby knows the converging point that is responsible for co-processing.

Figure 8:
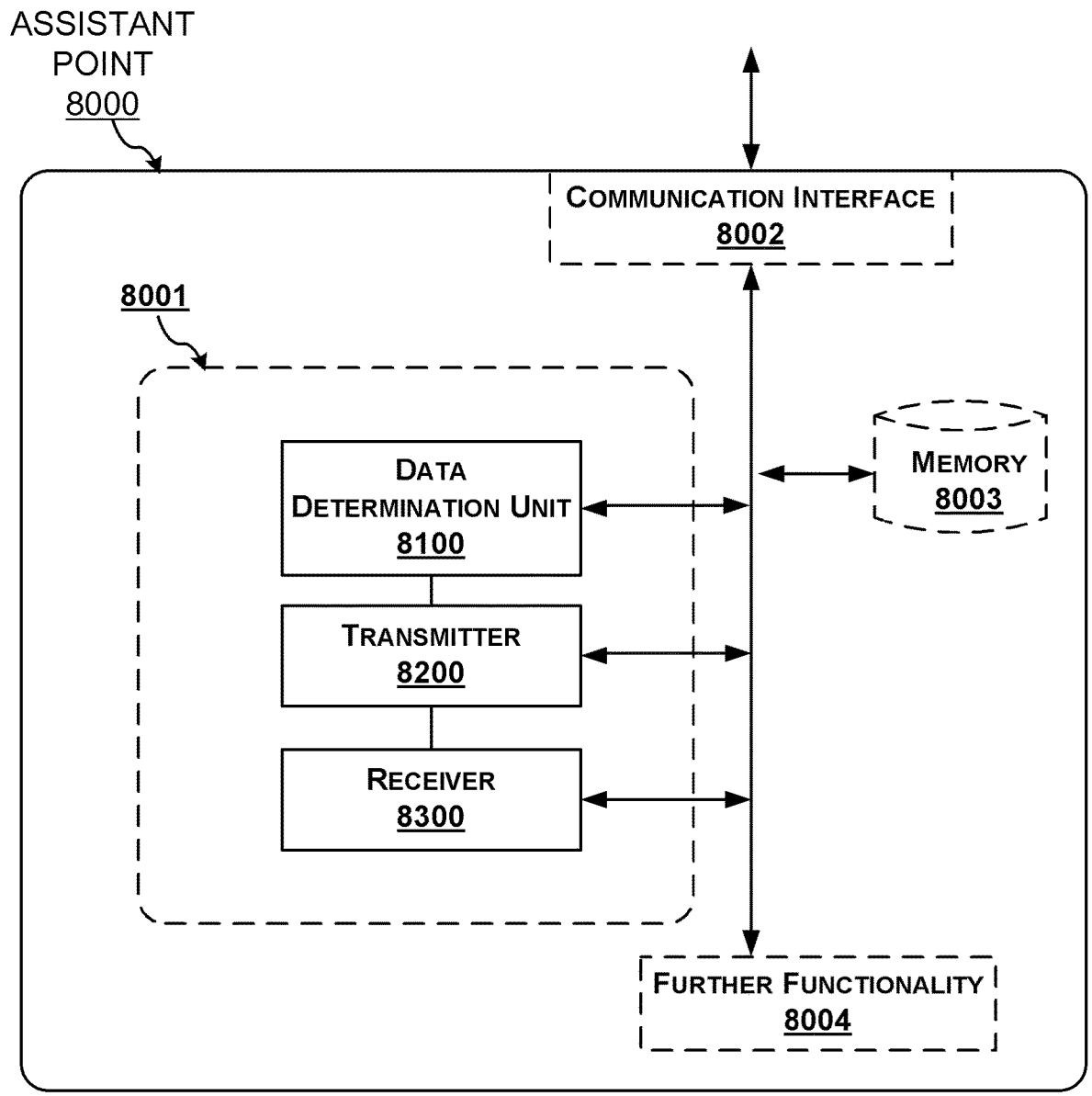
FIG. 8 illustrates a block diagram of an assistant point according to another embodiment of the disclosure.

FIG. 8 illustrates a block diagram of assistant point 8000 according to an embodiment of the disclosure. The part of assistant point 8000 which is most affected by the adaptation to the method and procedure described herein, e.g., the method shown in FIG. 3 and the procedure shown in FIGS. 4-6, is illustrated as an arrangement 8001, surrounded by a dashed line. Assistant point 8000 may be any kind of points, depending on in which type of communication system it is operable. Assistant point 8000 and arrangement 8001 are further configured to communicate with other entities via a communication interface 8002 which may be regarded as part of the arrangement 8001. The communication interface 8002 comprises means for wireless communication or wired communication with other devices or nodes, such as UE and the converging point. The arrangement 8001 or Assistant point 8000 may further comprise other functional units 8004, such as functional units providing regular functions, and may further comprise one or more storage units or memories 8003 for storing computer program code and other information thereon. The arrangement 8001 could be implemented, e.g., by one or more of: a processor or a micro processor capable of executing computer program code and adequate software and memory for storing of the software, a Programmable Logic Device (PLD) or other electronic component(s) or processing circuitry configured to perform the actions described above, and illustrated, e.g., in FIGS. 3-6. The arrangement part of Assistant point 8000 may be implemented as shown in FIG. 8. In particular, the arrangement 8001 comprises a data determination unit 8100, a transmitter 8200 and a receiver 8300. The function of data determination unit 8100, transmitter 8200 and receiver 8300 in the arrangement 8001 is the same as that of data determination unit 7100, transmitter 7200 and receiver 7300 in the assistant point 7000 shown in FIG. 7, and the detailed description is omitted herein for simplicity.

It should be noted that Assistant Point 8000 of FIG. 8 may include more or fewer elements than shown, in various arrangements, and each component may be implemeted in hardware, software or combination thereof.

Figure 9:
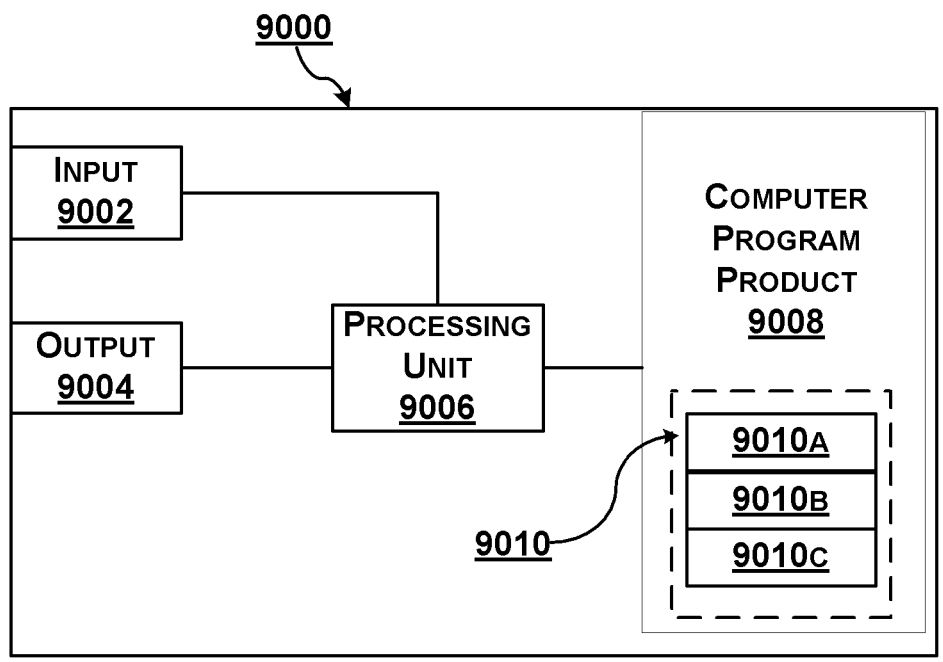
FIG. 9 is a schematic view of an arrangement which may be used in the assistant point shown in FIG. 8 according to an embodiment of the disclosure.

FIG. 9 is a schematic view of arrangement 9000 which may be used in Assistant Point 8000. Comprised in the arrangement 9000 are here a processing unit or processor 9006, e.g., with a Digital Signal Processor (DSP). The processing unit 9006 may be a single unit or a plurality of units to perform different actions of the method and procedures described herein. The arrangement 9000 may also comprise an input unit 9002 for receiving signals from other entities, and an output unit 9004 for providing signal(s) to other entities. The input unit and the output unit may be arranged as an integrated entity or as illustrated in the example of FIG. 9.

Furthermore, the arrangement 9000 comprises at least one computer program product 9008 in the form of a non-volatile or volatile memory, e.g., an Electrically Erasable Programmable Read-Only Memory (EEPROM), a flash memory and a hard drive. The computer program product 9008 comprises a computer program 9010, which comprises code/computer readable instructions, which when executed by the processing unit 9006 in the arrangement 9000 causes the arrangement 9000 and/or Assistant Point 8000 in which it is comprised to perform the actions, e.g., of the procedures described earlier in conjunction with FIGS. 3-6.

The computer program 9010 may be configured as a computer program code structured in computer program modules 9010A-9010C.

In an exemplifying embodiment, the code in the computer program of the arrangement 9000 includes a data determination module 9010A for selecting a predetermined number N of subbands with the best channel quality. The code in the computer program 9010 may further include a transmitting module 9010B for transmitting user data of the selected subbands.

According to an embodiment, the code in the computer program 9010 may further include a receiving module 9010C for receiving RBQ values of all subbands from the converging point. The data determination modules 9010A calculates RBQ values of all subbands, calculates uplink gains of all subbands based on the RBQ values of the converging point and its own RBQ values, and selects N subbands with the largest uplink gains.

The foregoing description of implementations provides illustration and description, but is not intended to be exhaustive or to limit the disclosure to the precise form disclosed. Modifications and variations are possible in light of the above teachings, or may be acquired from practice of the disclosure. For example, while blocks have been described with regard to FIGS. 3-6 in a specific order, the order of the blocks may be modified in other implementations consistent with the principles of the disclosure. Further, non-dependent blocks may be performed in parallel.

Aspects of the disclosure may also be implemented in methods and/or computer program products. Accordingly, the disclosure may be embodied in hardware and/or in hardware/software (including firmware, resident software, microcode, etc.). Furthermore, the disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the disclosure. Thus, the operation and behaviour of the aspects were described without reference to the specific software code—it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method for use in an assistant point in a Coordinated Multi-Point (CoMP) system, wherein the CoMP system includes a converging point and a plurality of assistant points that communicate with the converging point and with a user equipment (UE), the method performed in the assistant point, which is one of the plurality of assistant points, for providing uplink communication from the UE, via the assistant point, to the converging point, the method comprising:

receiving user data in the uplink communication from the UE;

calculating Resource Block Quality (RBQ) values of all subbands at the assistant point for the user data received;

receiving RBQ values of all subbands for the converging point sent to the plurality of assistant points from the converging point;

calculating uplink gains of all subbands based on the received RBQ values of the converging point and the RBQ values of the assistant point;

selecting, at the assistant point, a predetermined number N of subbands with largest uplink gains from the calculated uplink gains as having best channel quality, wherein indexes of the selected N subbands identify the selected N subbands;

transmitting user data only of the selected N subbands, instead of all the subbands, from the assistant point to the converging point; and transmitting the indexes of the selected N subbands to the converging point to identify the selected N subbands sent from the assistant point for co-processing the user data with data sent on other selected subbands of other assistant point or points of the plurality of assistant points to the converging point.

2. The method according to claim 1, wherein the user data and the indexes are transmitted in different signaling.

3. The method according to claim 1, further comprising: pre-processing the user data to obtain soft bits, and wherein the obtained soft bits are transmitted as the user data.

4. The method according to claim 1, further comprising: receiving, from an upper layer component, a notification message indicating the converging point in the CoMP system.

5. The method according to claim 1, further comprising: transmitting the RBQ values of all subbands to an upper layer component, which sums the RBQ values for the plurality of assistant points, and selects a respective assistant point with a largest summed RBQ value as the converging point.

6. The method according to claim 1, wherein the converging point is a serving point among the plurality of assistant points in the CoMP system.

7. An assistant point in a Coordinated Multi-Point (CoMP) system, wherein the CoMP system includes a converging point and a plurality of assistant points that communicate with the converging point and with a user equipment (UE), the assistant point, which is one of the plurality of assistant points, for providing uplink communication from the UE, via the assistant point, to the converging point, the assistant point comprising:

at least one communication interface configured for communication, a processor, and a memory storing computer program code thereon which, when running on the processor, causes the assistant point to:

receive user data in the uplink communication from the UE;

calculate Resource Block Quality (RBQ) values of all subbands at the assistant point for the user data received;

receive RBQ values of all subbands for the converging point sent to the plurality of assistant points from the converging point;

calculate uplink gains of all subbands based on the received RBQ values of the converging point and the RBQ values of the assistant point;

select, at the assistant point, a predetermined number N of subbands with largest uplink gains from the calculated uplink gains as having best channel quality, wherein indexes of the selected N subbands identify the selected N subbands; and wherein the communication interface is to transmit user data only of the selected N subbands, instead of all the subbands, from the assistant point to the converging point and transmit the indexes of the selected N subbands to the converging point to identify the selected N subbands sent from the assistant point for co-processing the user data with data sent on other selected subbands of other assistant point or points of the plurality of assistant points to the converging point.

8. The assistant point according to claim 7, which is further caused to:

pre-process the user data to obtain soft bits, and wherein the obtained soft bits are transmitted as the user data.

9. The assistant point according to claim 7, wherein the communication interface receives, from an upper layer component, a notification message indicating the converging point in the CoMP system.

* * * * *